No. 807,192. PATENTED DEC. 12, 1905.
W. J. NELSON.
FRICTION WINDLASS.
APPLICATION FILED MAR. 6, 1905.

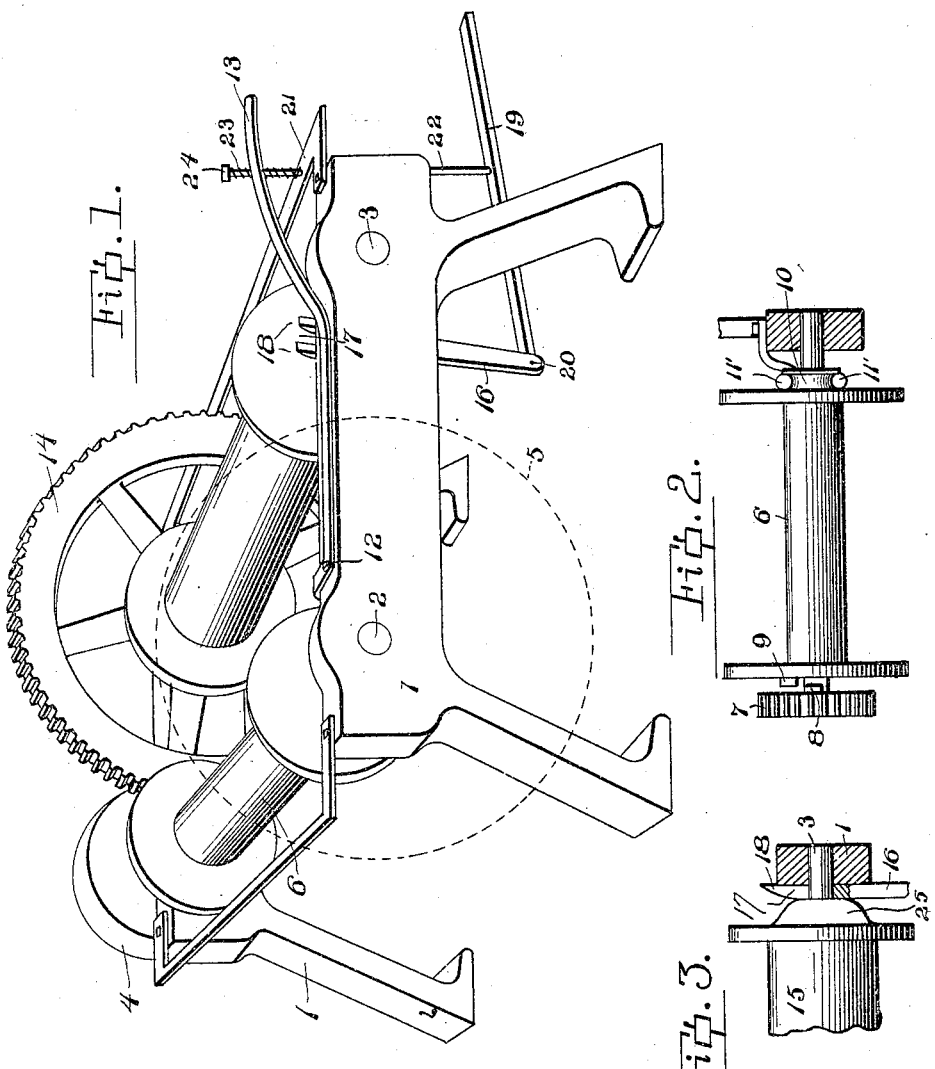

2 SHEETS—SHEET 2.

UNITED STATES PATENT OFFICE.

WILLIAM J. NELSON, OF ADAMS, MASSACHUSETTS.

FRICTION-WINDLASS.

No. 807,192.      Specification of Letters Patent.      Patented Dec. 12, 1905.

Application filed March 6, 1905. Serial No. 248,563.

*To all whom it may concern:*

Be it known that I, WILLIAM J. NELSON, a citizen of the United States, residing at Adams, in the county of Berkshire and State of Massachusetts, have invented certain new and useful Improvements in Friction-Windlasses, of which the following is a specification.

My invention relates to improvements in friction-windlasses, and has for its objects the provision of a device of this character which is applicable to and adapted to operate hay-forks and similar mechanisms embodying a compact, easily-controlled, and efficient mechanism for the purpose intended.

The invention consists of an apparatus, as described, embodying a driven pulley for operating the device and means for clutching said pulley with the drum of the windlass to operate the same.

The invention further consists in certain novel features of construction and combinations and arrangements of parts, as will be described in the specification, more fully pointed out in the claims, and illustrated in the accompanying drawings, in which—

Figure 4:
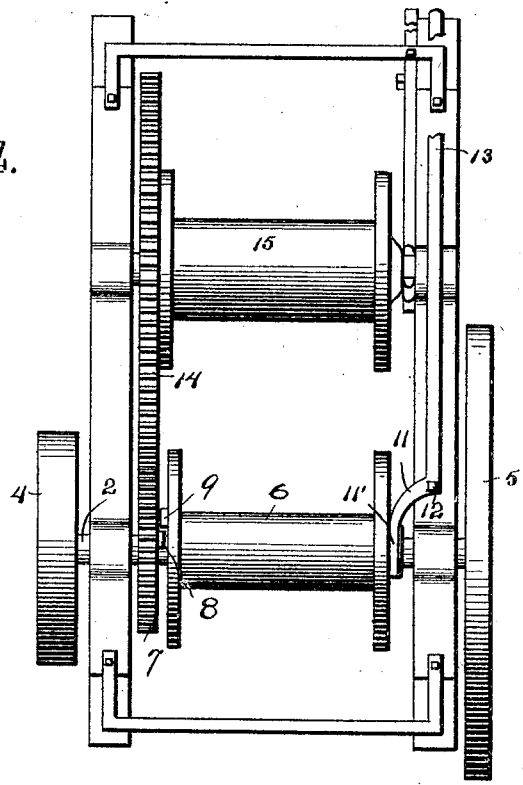
Figure 5:
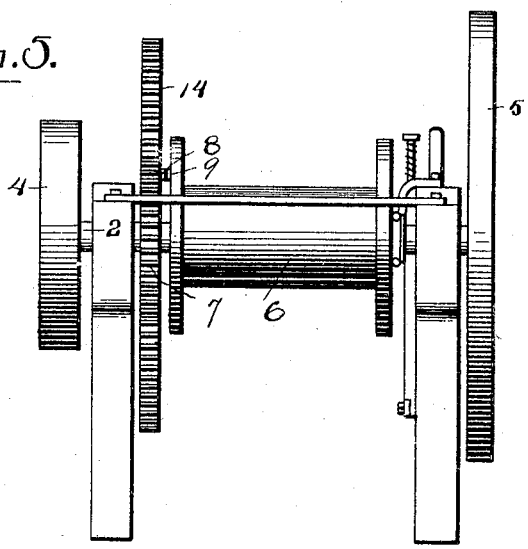

Figure 1 is a perspective view of the machine embodying the features of my invention. Fig. 2 is a detail view, partly in section, showing the clutch for one of the windlass-drums and operating means therefor. Fig. 3 is a detail view, partly in section, of a second clutch-operating mechanism used with the machine. Fig. 4 is a top plan view of the windlass, parts being broken away; and Fig. 5 is an elevation of the device looking from the left in Fig. 1.

The entire mechanism, as shown in Fig. 1, is supported on the two sections 1 1, forming the frame or support for the windlass. These sections may be attached to suitable timbers forming the base or foundation of the machine. The two drum-shafts 2 and 3 are journaled in the frame-sections 1 in usual manner.

The entire mechanism is portable as a whole and may be driven by a gas-engine or other suitable motor through the pulley-wheel 4, located on one end of shaft 2, by a belt or other suitable connection. A balance-wheel 5, as usual, is journaled on the opposite end of shaft 2 to steady the rotation of the shaft 2 and the drum carried thereby.

A loosely-supported rope-drum 6 is free to rotate on the shaft 2. This drum is capable of a longitudinal sliding motion on said shaft and when properly coupled is adapted to rotate therewith. The gear-wheel 7, which forms one member of the clutch for driving the drum 6, is rigid with the shaft 2 and has on its face adjacent the drum 6 a lug or projection 8. A complementary lug 9 projects from drum 6 toward the gear-wheel 7. These two lugs 8 and 9 are equidistant from the center of shaft 2 and when brought into the same vertical plane form a clutch for driving the drum 6. One end of the drum 6, or rather one end of its sleeve, is grooved at 10, and this groove forms a seat for the bifurcated lever-arm 11, the ends 11' of said arm fitting neatly therein. Lever-arm 11 is pivoted to the frame 1 at 12 and is provided with a hand-lever 13. Thus when it is desirable to rotate the drum 6 a movement of the lever 13 toward the observer in Fig. 1 will slide the drum 6 on the shaft 2, bringing the lugs 8 and 9 into the same path of movement, when if the pulley 4 is driven and gear-wheel 7 rotating these lugs will contact and the drum is driven or rotated through the medium of lugs 8 and 9, as will be understood, rotating the rope-drum 6 and winding a rope thereon. Gear-wheel 7 meshes with and is adapted to drive the larger wheel 14, which is journaled on and rigid with shaft 3. A second rope-drum frictionally driven, as 15, is loosely carried by shaft 3, and said drum is capable of a longitudinal sliding motion on the shaft. This drum 15 is operated by friction from the gear-wheel 14 in the following manner: The end of arm 16 is grooved or slotted at 17, forming two arms 18 18. As clearly shown in Fig. 3, these arms are wedge-shaped and surround the shaft 3, the shaft protruding through the groove 17. Lever 19 is pivoted to the lever at 20 and is hung from the bracket 21 by rod 22. A spring 23 is interposed between the head 24 of rod 22 and bracket 21 to return the lever to normally raised position. To engage the friction-clutch, a downward pressure of the foot on lever 19 depresses said lever against tension of spring 23. At the same time this movement lifts the arm 16. As arm 16 is raised the wedge-shaped ends 18 of the arm are made to rise vertically and pass between the end 25 of the drum 15 and the frame 1, and a further movement of the wedges in an upward direction shoves the drum 15 toward the gear-wheel 14, causing friction between said wheel and drum. The wheel and drum being in frictional contact and the gear-wheel revolving, the drum 15, which is loosely carried by shaft 3, is made to rotate with the gear-wheel and wind a rope on the drum. As long as lever 19 is depressed the drum and wheel are in frictional contact and will rotate together. When the foot is lifted from the foot-lever 19, spring 23 will lift the lever and pull down the wedge-arms 18 and lever-arm 16, thus relieving the friction from the members and the driving power from the drum.

Having thus fully described my invention, what I claim as new, and desire to secure by Letters Patent, is—

1. The combination in a windlass of a pair of shafts, a gear-wheel on each shaft and meshing, a loosely-carried drum on each shaft, a coupling between one gear-wheel and drum and means for engaging said coupling, and a wedge-shaped lever adapted to slide the second drum into frictional contact with the second gear-wheel, whereby said drum is rotated.

2. The combination in a windlass of a pair of shafts, a pair of gear-wheels, a pair of loosely-carried drums on said shafts, a coupling formed by lugs between one of said wheels and a drum, a sleeve on said drum a lever to engage said sleeve for longitudinally sliding said drum and engaging the coupling, and a wedge-shaped lever for sliding the second drum into frictional contact with the second gear-wheel for driving the said drum.

In testimony whereof I affix my signature in presence of two witnesses.

WILLIAM J. NELSON.

Witnesses:
JESSIE B. KERR,
F. R. SHAW.